US012083801B2

(12) United States Patent
Kawai

(10) Patent No.: US 12,083,801 B2
(45) Date of Patent: Sep. 10, 2024

(54) INK SUPPLYING DEVICE AND PRINTING APPARATUS

(71) Applicant: MIMAKI ENGINEERING CO., LTD., Nagano (JP)

(72) Inventor: Tomoya Kawai, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 147 days.

(21) Appl. No.: 18/075,355

(22) Filed: Dec. 5, 2022

(65) Prior Publication Data

US 2023/0173813 A1 Jun. 8, 2023

(30) Foreign Application Priority Data

Dec. 7, 2021 (JP) ................................ 2021-198913

(51) Int. Cl.
*B41J 2/175* (2006.01)
*B41J 2/14* (2006.01)
*B41J 2/18* (2006.01)
*B41J 25/34* (2006.01)

(52) U.S. Cl.
CPC ............ *B41J 2/17503* (2013.01); *B41J 2/14* (2013.01); *B41J 2/18* (2013.01); *B41J 25/34* (2013.01); *B41J 2202/12* (2013.01); *B41J 2202/15* (2013.01)

(58) Field of Classification Search
CPC ............... B41J 2/175; B41J 25/34; B41J 2/18
See application file for complete search history.

(56) References Cited

U.S. PATENT DOCUMENTS

2016/0101628 A1* 4/2016 Kobayashi ........... B41J 2/17513
347/86

FOREIGN PATENT DOCUMENTS

| | | | | |
|---|---|---|---|---|
| CN | 104260557 A * | 1/2015 | .............. | B41J 2/175 |
| JP | 2004314304 | 11/2004 | | |
| JP | 2014144647 A * | 8/2014 | .......... | B41J 2/17509 |

OTHER PUBLICATIONS

Kobayashi, Machine TranslationofCN-104260557-A, 2015 (Year: 2015).*
Kobayashi, Machine TranslationofJP-2014144647-A, 2014 (Year: 2014).*

* cited by examiner

*Primary Examiner* — Scott A Richmond
(74) *Attorney, Agent, or Firm* — JCIPRNET

(57) ABSTRACT

An ink supplying device includes: an attachment unit to which a cartridge for storing ink to be supplied to an inkjet head of a printing apparatus is attached and in which an internal flow path is formed for the ink stored in the cartridge to flow; an external tube that is connected to the internal flow path of the attachment unit and circulates the ink; and a base portion that supports the attachment unit and a part of the external tube. The attachment unit is supported by the base portion so as to be rotatable in a direction around a predetermined central axis. The external tube is disposed in a curved state from a connecting portion connected to the internal flow path to a supported portion supported by the base portion and is provided such that the curved state changes in accordance with the rotation of the attachment unit.

17 Claims, 4 Drawing Sheets

INK SUPPLYING DEVICE AND PRINTING APPARATUS

CROSS REFERENCE TO RELATED APPLICATIONS

This application claims the priority benefit of Japanese Patent Application No. 2021-198913, filed on Dec. 7, 2021. The entirety of the above-mentioned patent application is hereby incorporated by reference herein and made a part of this specification.

TECHNICAL FIELD

The present disclosure relates to an ink supplying device and a printing apparatus.

DESCRIPTION OF THE BACKGROUND ART

In an inkjet-type printing apparatus, for example, an ink supplying device is used in which a cartridge for storing ink is attached to an attachment unit, and ink is supplied from the cartridge to a head (e.g., see Japanese Unexamined Patent Publication No. 2004-314304).

SUMMARY

In the ink supplying device as described above, the component of the ink may be deposited in the cartridge, and the concentration of the ink in the cartridge may become non-uniform. Hence it is required to appropriately perform stirring in the cartridge.

The present disclosure has been made in view of the above, and an object thereof is to provide an ink supplying device and a printing apparatus capable of appropriately performing stirring in an ink cartridge.

An ink supplying device according to the present disclosure includes: an attachment unit to which a cartridge for storing ink to be supplied to an inkjet head of a printing apparatus is attached and in which an internal flow path is formed for the ink stored in the cartridge to flow; an external tube that is connected to the internal flow path of the attachment unit and circulates the ink; and a base portion that supports the attachment unit and a part of the external tube. The attachment unit is supported by the base portion so as to be rotatable in a direction around a predetermined central axis. The external tube has flexibility. The external tube is fixed by a connecting portion connected to the internal flow path and a supported portion provided in the base portion and is disposed in a curved state between the connecting portion and the supported portion.

In the ink supplying device described above, the central axis and the connecting portion are disposed at different positions in a horizontal direction, and the external tube is disposed to extend toward the central axis.

In the ink supplying device described above, the supported portion is provided below the connecting portion in a vertical direction and is provided on the connecting portion side with respect to the central axis in the horizontal direction.

In the ink supplying device described above, the external tube is disposed in a curved state at a position corresponding to the central axis.

In the ink supplying device described above, the external tube is provided with such a length that a curved state is maintained during the rotation in a range in which the attachment unit is rotatable in a direction around the axis of the central axis.

A printing apparatus according to the present disclosure includes: a body including an inkjet head that ejects ink onto a medium; and an ink supplying unit that supplies the ink to the inkjet head. The ink supplying device described above is used as the ink supplying unit.

In the printing apparatus described above, the ink supplying unit is provided in a state of being separated from the body.

In the printing apparatus described above, the ink supplying unit is disposed at a position lower in height than the body.

According to the present disclosure, stirring can be appropriately performed in the ink cartridge.

DETAILED DESCRIPTION OF EMBODIMENTS

Hereinafter, an embodiment of an ink supplying device and a printing apparatus according to the present disclosure will be described with reference to the drawings. Note that the present disclosure is not limited by the embodiment. In addition, constituent elements in the following embodiment include those easily replaceable by a person skilled in the art or those substantially identical.

Figure 1:
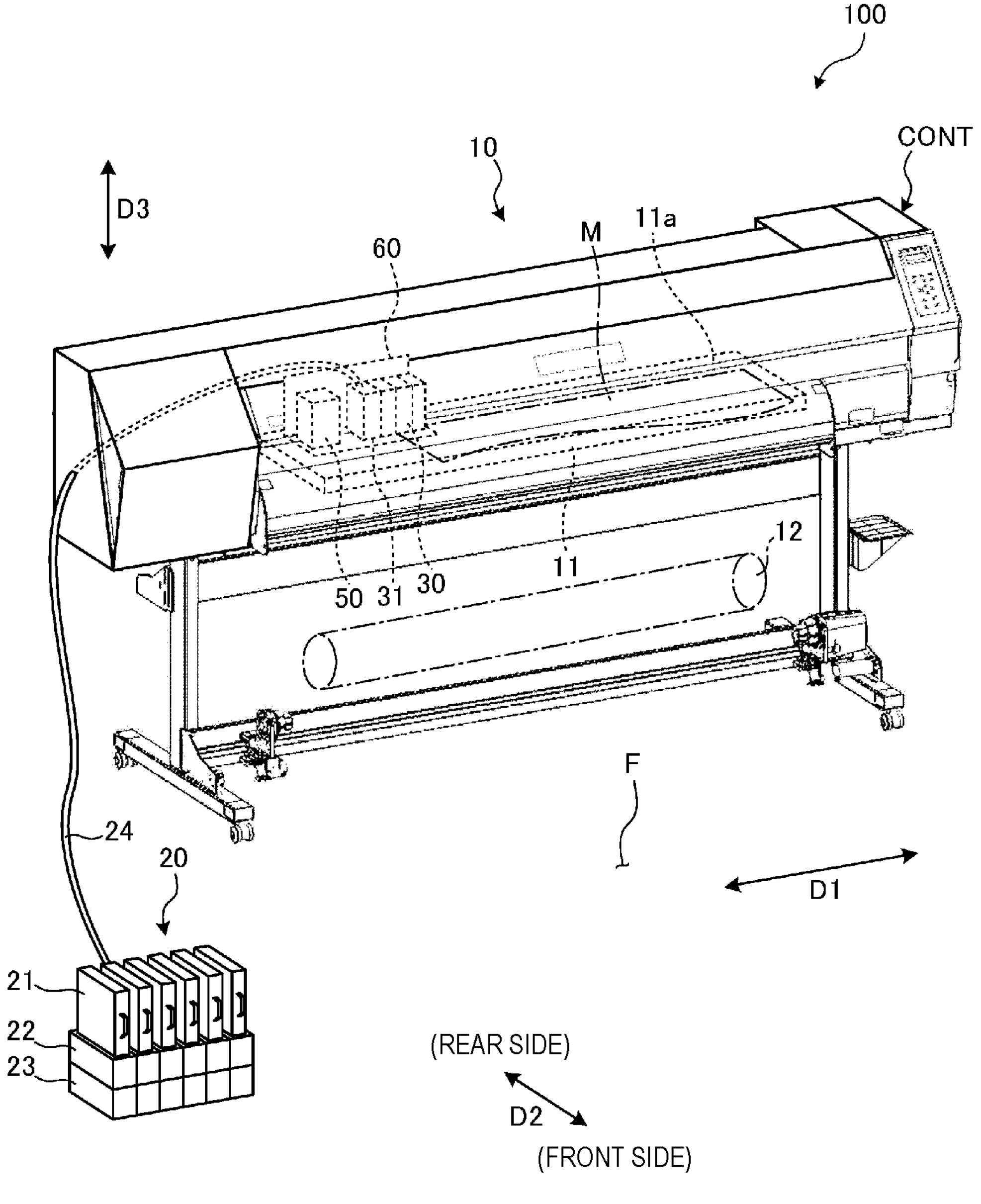
FIG. 1 is a perspective view illustrating an example of a printing apparatus according to the present embodiment.

FIG. 1 is a perspective view illustrating an example of a printing apparatus 100 according to the present embodiment. As illustrated in FIG. 1, the printing apparatus 100 is an inkjet-type printing apparatus and includes a body 10, an ink supplying unit (ink supplying device) 20, and a control device CONT. Examples of the printing apparatus 100 as thus described include various types such as a vertical type and a flatbed type.

The body 10 includes a medium supporting unit 11 and a medium driving unit 12. The medium supporting unit 11 supports a medium M on a placement surface 11*a*. The medium driving unit 12 moves the medium M in a direction (medium conveyance direction) D2 orthogonal a main scanning direction D1.

The body 10 includes a carriage 60. A head 30 and a light irradiator 50 are mounted on the carriage 60. The carriage 60 is provided to be movable along the main scanning direction D1 in a state where the head 30 and the light irradiator 50 are mounted under the control of the control device CONT.

The head 30 has a nozzle surface 31 facing the placement surface 11*a*. The nozzle surface 31 has, for example, a planar shape. The nozzle surface 31 is provided with a plurality of nozzles (not illustrated) for ejecting ink. Examples of the ink include an ultraviolet-curable ink. As the type of ultraviolet-curable ink, for example, a white ink, coloring inks such as cyan (C), magenta (M), yellow (Y), and black (K), a transparent ink, and the like can be appropriately used in accordance with the hue of the image to be formed on the medium M, and the like. For the coloring ink, a dye ink may be used, or a pigment ink such as silver or orange may be used. The head 30 is electrically connected to the control unit CONT, and the driving thereof is controlled by the control unit CONT. By the movement of the carriage 60, the head 30 ejects the ink toward the placement surface 11*a* while reciprocating along the main scanning direction D1.

The light irradiator 50 irradiates an ultraviolet-curable ink ejected on the placement surface 11*a* with the ultraviolet light. The light irradiator 50 includes, for example, an LED (light-emitting diode) module or the like capable of performing irradiation with ultraviolet rays. The light irradiator 50 is mounted on the carriage 60 and can reciprocate in the main scanning direction D1 as the carriage 60 moves along the main scanning direction D1. The light irradiator 50 is electrically connected to the control unit CONT, and the driving thereof is controlled by the control unit CONT.

The ink supplying unit 20 supplies ink to the head 30. In the present embodiment, the ink supplying unit 20 is provided separately from the body 10. By the ink supplying unit 20 being provided separately from the body 10, the placement of the ink supplying unit 20 can be set flexibly. The ink supplying unit 20 can be disposed at a position lower than the body 10, such as a floor F, for example. By the ink supplying unit 20 being disposed at a position lower than the body 10 (e.g., floor F, etc.), a user can easily perform work such as the replacement and stirring of the cartridge 21.

Figure 2:
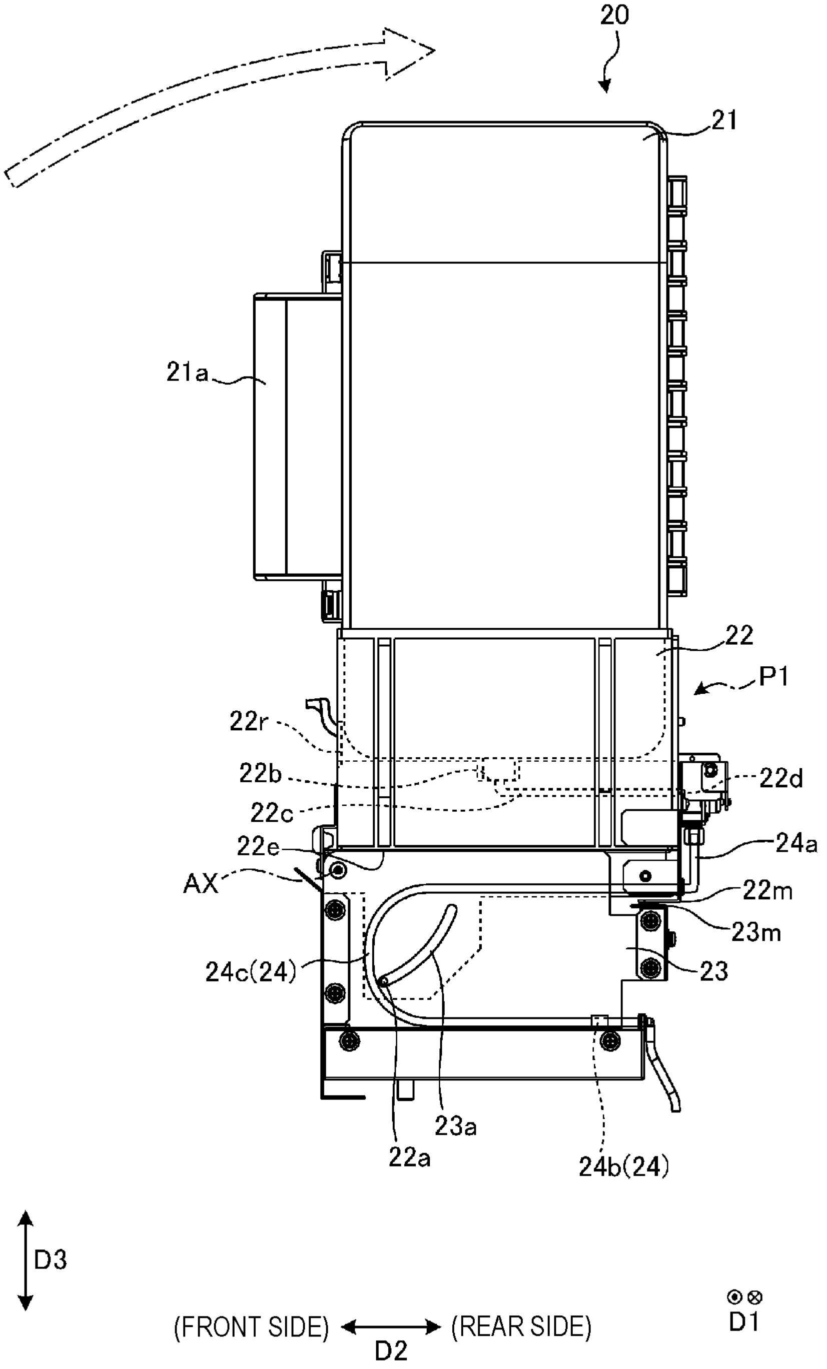
FIG. 2 is a diagram illustrating an example of an ink supplying unit.
Figure 3:
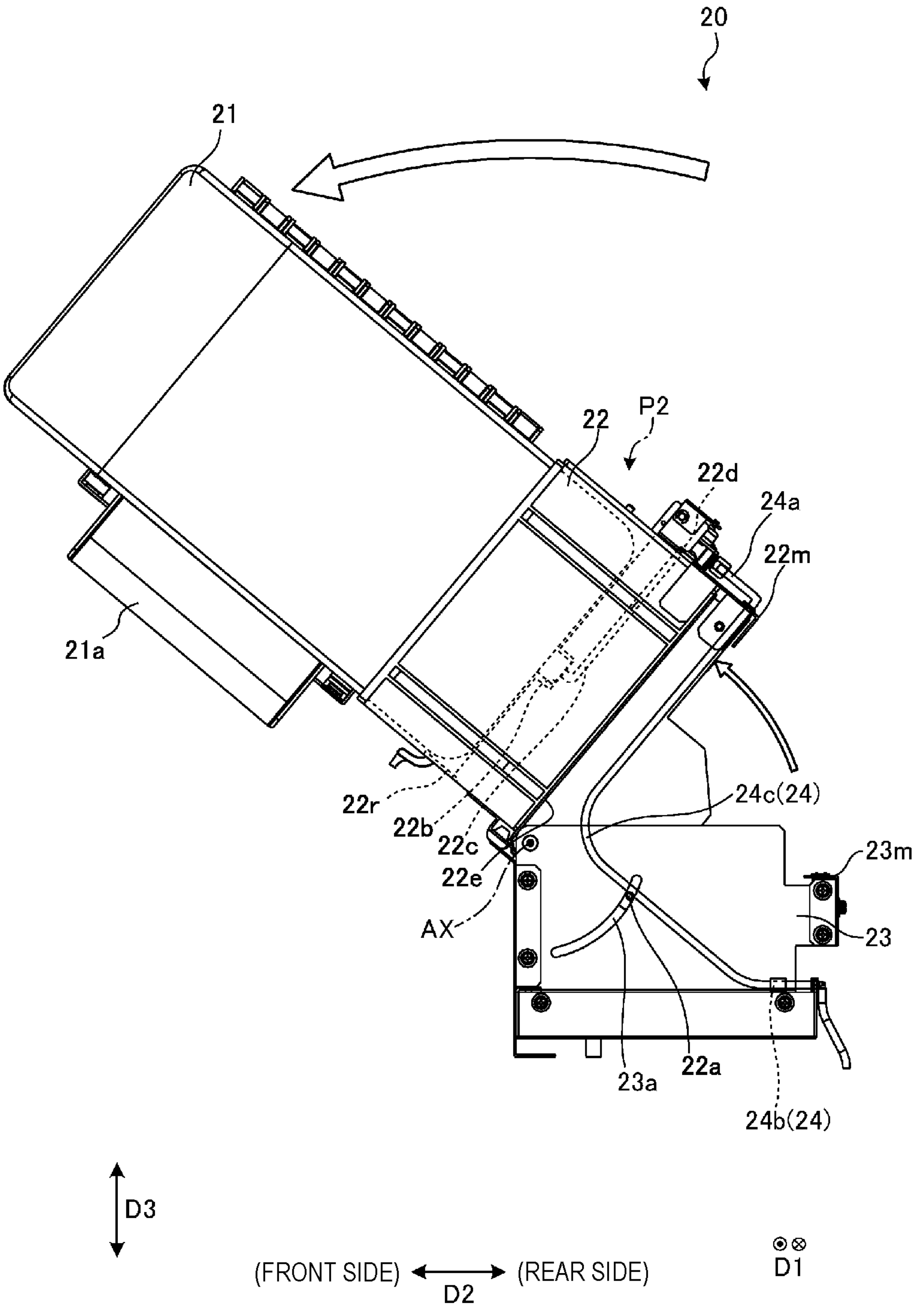
FIG. 3 is a diagram illustrating an example of the ink supplying unit.

FIGS. 2 and 3 are diagrams illustrating an example of the ink supplying unit 20. FIGS. 2 and 3 illustrate a case where the ink supplying unit 20 is viewed from the main scanning direction D1. In FIGS. 2 and 3, the left side in the figure is the front side, and the right side in the figure is the rear side. As illustrated in FIGS. 2 and 3, the ink supplying unit 20 includes a cartridge 21, an attachment unit 22, a base portion 23, and an external tube 24. The cartridge 21 stores ink therein. A plurality of cartridges 21 are provided in accordance with the type of ink. The cartridge 21 includes a handle 21*a*. The handle 21*a* is formed in such a size and shape that a user can grip the handle 21*a*. The cartridge 21 is attached to the attachment unit 22 such that the handle 21*a* is disposed on the front side.

The cartridge 21 is attached to the attachment unit 22 so as to be replaceable. The attachment unit 22 attaches and detaches the cartridge 21 along a perpendicular direction D3. A plurality of the attachment units 22 are provided in accordance with the types of the cartridge 21. One cartridge 21 is attached to one attachment unit 22. The attachment unit 22 is supported by the base portion 23 so as to be rotatable around an axis of a predetermined central axis AX. The central axis AX is set, for example, in a direction orthogonal to the perpendicular direction D3, which is the attachment direction of the cartridge 21, for example, in a horizontal direction or a direction along the floor F. In the present embodiment, the plurality of attachment units 22 are arranged side by side along the axial direction of the central axis AX. The plurality of attachment units 22 are provided to be individually rotatable. Each attachment unit 22 is rotatable in a state where the cartridge 21 is attached. The attachment unit 22 is rotatable, for example, between a holding position P1 (cf. FIG. 2) held by the base portion 23 and an inclined position P2 (cf. FIG. 3) inclined toward the front side.

The attachment unit 22 is provided with a protrusion 22*a*. The protrusion 22*a* is inserted into a guide groove 23*a* of the base portion 23 to be described later. When the attachment unit 22 rotates around the axis of the central axis AX, the protrusion 22*a* moves along the guide groove 23*a*. In this case, the protrusion 22*a* comes into contact with the end of the guide groove 23*a*, so that the rotation of the attachment unit 22 is restricted between the holding position P1 and the inclined position P2.

The attachment unit 22 includes a locked portion 22*r*. The locked portion 22*r* locks a locking portion 21*r* of the attached cartridge 21. The locking portion 21*r* is disposed such that, at the time of the cartridge 21 being inserted into the attachment unit 22, the locking portion 21*r* is elastically deformed and enters the inside of the attachment unit 22, and in a state where the cartridge 21 is attached to the attachment unit 22, the locking portion 21*r* protrudes from the locked portion 22*r* to the outside by an elastic force.

The attachment unit 22 includes an ink inflow port 22*b*, an internal flow path 22*c*, and an ink outflow port 22*d*. The ink inflow port 22*b* is disposed at a position corresponding to an ink supply port 21*b* of the cartridge 21 in a state where the cartridge 21 is attached. The ink supplied from the ink supply port 21*b* of the cartridge 21 flows into the ink inflow port 22*b*. The ink flowing in from the ink inflow port 22*b* flows through the internal flow path 22*c*. The internal flow path 22*c* extends toward the rear side of the ink supplying unit 20. The ink outflow port 22*d* is disposed on the rear side of the ink supplying unit 20, and the ink flowing through the flow path 22*c* flows out of the ink outflow port 22*d*.

The base portion 23 supports the attachment unit 22. The base portion 23 collectively supports the plurality of attachment units 22. The base portion 23 has a magnet portion 23*m*. The magnet portion 23*m* attracts the attachment unit 22 disposed at a holding position P1 by a magnetic force. Note that the attachment unit 22 is provided with a magnetic body portion 22*m* that generates a magnetic force with the magnet portion 23*m*. With this configuration, the base portion 23 can stably hold the attachment unit 22.

The external tube 24 is formed to be deformable using, for example, resin or the like. The external tube 24 is flexible. The connecting portion 24*a*, which is one end of the external tube 24, is connected to the ink outflow port 22*d* of the attachment unit 22. The ink flowing out from the ink outflow port 22*d* flows through the external tube 24. The external tube 24 is disposed to extend downward from the connecting portion 24*a*, bend toward the front side, extend toward the front side along a bottom 22*e* of the attachment unit 22, be curved downward at a position corresponding to the central axis AX to form a curved portion 24*c*, and extend from the curved portion 24*c* toward the rear side along the base portion 23. The external tube 24 is disposed such that a supported portion 24*b* is supported by the base portion 23 and extends from the base portion 23 in a direction toward the back surface. The external tube 24 is disposed in a curved state between the connecting portion 24*a* and the supported portion 24*b*. In the present embodiment, the central axis AX and the connecting portion 24*a* are disposed at different positions in the horizontal direction. The external tube 24 is disposed so as to extend toward the central axis AX. The supported portion 24*b* is connected to the head 30 via an ink driving unit including a pump (not illustrated), other tubes, and the like. The supported portion 24*b* is provided below the connecting portion 24*a* in the vertical direction. The supported portion 24*b* is provided on the connecting portion 24*a* side with respect to the central axis AX in the horizontal direction. The external tube 24 is provided with such a length that a curved state is maintained during rotation in a range in which the attachment unit 22 is rotatable in the direction around the axis of the central axis AX. The external tube 24 is disposed as above and is thus provided such that the curved state changes in accordance with the rotation of the attachment unit 22.

An example of the operation of the printing apparatus 100 configured as described above will be described. The user of the printing apparatus 100 has the medium M placed on the placement surface 11*a* of the medium supporting unit 11 in advance. In this state, for example, when an instruction to perform the printing operation from an external device, the control unit CONT moves the carriage 60 in the main scanning direction D1. The control unit CONT causes ink to be ejected from the head 30 in conjunction with the movement of the carriage 60. By this operation, the ink adheres to the medium M. The control unit CONT repeatedly performs the above operation while moving the medium M in the medium moving direction D2. By this control, an image is formed on the medium M.

For example, in a pigment ink or the like in which a coloring component is dispersed in a solvent, when the cartridge 21 is kept at a constant position, the coloring component may be deposited, and the density of the ink may be distributed in the cartridge 21. Therefore, it is necessary to appropriately perform stirring in the cartridge 21.

In the ink supplying unit 20 according to the present embodiment, the user grabs the handle 21*a* of the cartridge 21 and pulls the handle 21*a* toward the front side, whereby the attachment unit 22 is separated from the holding position P1 held by the base portion 23 and rotates along the direction around the central axis AX. As illustrated in FIG. 3, the attachment unit 22 moves from the holding position P1 to the inclined position P2. In addition, the user grabs the handle 21*a* of the cartridge 21 and pushes the handle to the rear side, whereby the attachment unit 22 rotates along the direction around the axis of the central axis AX and returns to the holding position P1 held by the base portion 23 as illustrated in FIG. 2. As thus described, the user grabs the handle 21*a* of the cartridge 21 and pushes and pulls the handle toward the front side and the rear side, whereby the attachment unit 22 and the cartridge 21 integrally swing in the direction around the central axis AX. This swing causes the ink inside the cartridge 21 to be stirred.

When the attachment unit 22 swings in the direction around the axis of the central axis AX, the curved state of the external tube 24 changes in accordance with the swing of the attachment unit 22. That is, when the attachment unit 22 is inclined toward the front side from the state where the attachment unit 22 stands by at holding position P1, the external tube 24 is deformed so that the curved portion 24*c* between the connecting portion 24*a* and the supported portion 24*b* is opened in the perpendicular direction D3 as illustrated in FIG. 3. When the attachment unit 22 is returned from the state of being inclined toward the front side to the holding position P1 side, the external tube 24 is deformed so that a space between the connecting portion 24*a* and the supported portion 24*b* is closed in the perpendicular direction D3. As described above, with the external tube 24 being deformed in accordance with the swing of the attachment unit 22, it is possible, for example, to prevent the external tube 24 from being pulled out or bent under tension, thereby preventing the flow of ink from being impeded. Therefore, it is possible to stir the inside with the cartridge 21 attached to the attachment unit 22.

As described above, the ink supplying unit 20 according to the present embodiment includes: the attachment unit 22 to which the cartridge 21 for storing ink to be supplied to the head 30 of the printing apparatus 100 is attached and in which the internal flow path 22*c* is formed for the ink stored in the cartridge 21 to flow; the external tube 24 that is connected to the internal flow path 22*c* of the attachment unit 22 and circulates the ink, and the base portion 23 that supports the attachment unit 22 and a part of the external tube 24. The attachment unit 22 is supported by the base portion 23 so as to be rotatable in the direction around the predetermined central axis AX. The external tube 24 has flexibility. The external tube 24 is fixed by the connecting portion 24*a* connected to the internal flow path 22*c* and the supported portion 24*b* provided in the base portion 23 and is disposed in a curved state between the connecting portion 24*a* and the supported portion 24*b*.

With this configuration, the attachment unit 22 rotates along the direction around the axis of the central axis AX, so that the attachment unit 22 and the cartridge 21 can be integrally swung in the direction around the axis of the central axis AX. This swing can cause the ink inside the cartridge 21 to be stirred. Further, when the attachment unit 22 swings in the direction around the axis of the central axis AX, the curved state of the external tube 24 changes in accordance with the swing of the attachment unit 22, so that, for example, it is possible to prevent tension from being applied to the external tube 24 and the external tube from being pulled out or bent, thereby preventing the flow of ink from being inhibited. Therefore, it is possible to stir the inside with the cartridge 21 attached to the attachment unit 22. Hence it is possible to perform stirring in the ink cartridge 21.

In the ink supplying unit 20, the central axis AX and the connecting portion 24*a* are disposed at different positions in the horizontal direction, and the external tube 24 is disposed to extend toward the central axis AX. With this configuration, the external tube 24 can be deformed in a mode in which tension, bending, and the like are hardly generated.

In the ink supplying unit 20, the supported portion 24*b* is provided below the connecting portion 24*a* in the vertical direction and is provided on the connecting portion 24*a* side with respect to the central axis AX in the horizontal direction. With this configuration, it is possible to deform the external tube 24 while maintaining a curved state so as to protrude toward the central axis AX side from the connecting portion 24*a* to the supported portion 24*b*.

In the ink supplying unit 20, the external tube 24 is disposed in a curved state at a position corresponding to the central axis. With this configuration, the external tube 24 can be deformed in a mode in which tension, bending, and the like are hardly generated.

In the ink supplying unit 20 described above, the external tube 24 is provided with such a length that a curved state is maintained during the rotation in a range in which the attachment unit 22 is rotatable in the direction around the axis of the central axis AX. With this configuration, it is possible to swing the attachment unit 22 within an appropriate range while preventing the occurrence of tension, bending, and the like in the external tube 24.

The printing apparatus 100 according to the present disclosure includes: the body 10 having the head 30 that ejects ink onto a medium; and the ink supplying unit 20 that supplies ink to the head 30. With this configuration, a high-quality image can be formed on the medium M by appropriate stirring in the cartridge 21.

In the printing apparatus 100 described above, the ink supplying unit 20 is provided in the state of being separated from the body 10. With this configuration, by the ink supplying unit 20 being provided separately from the body 10, the placement of the ink supplying unit 20 can be set flexibly.

In the printing apparatus 100 described above, the ink supplying unit 20 is disposed at a position lower in height than the body 10. With this configuration, by the ink supplying unit 20 being disposed at a position lower than the body 10, the user can easily perform work such as the replacement and stirring of the cartridge 21.

The technical scope of the present disclosure is not limited to the above embodiment but can be appropriately changed without departing from the gist of the present disclosure. For example, in the embodiment described above, the configuration in which the ink supplying unit 20 is provided in the state of being separated from the body 10 has been described as an example, but the present disclosure is not limited thereto. For example, the ink supplying unit 20 may be provided integrally with the body 10.

In the above embodiment, the configuration in which the external tube 24 is disposed in a curved state at the position corresponding to the central axis AX has been described as an example, but the present disclosure is not limited thereto. As long as the curved state changes in accordance with the rotation of the attachment unit 22, the external tube 24 may be disposed in a curved state at a position not corresponding to the central axis AX.

In the embodiment described above, the configuration in which, when a plurality of attachment units 22 are provided, all the attachment units 22 are individually rotatable, has been described as an example, but the present disclosure is not limited thereto. At least two attachment units 22 may be rotated integrally. In the configuration in which the plurality of attachment units 22 are provided, at least one attachment unit 22 may not be rotated.

In the above embodiment, the configuration in which the attachment unit 22 is rotated by an operator manually swinging the cartridge 21 to the front side and the rear side has been described as an example, but the present disclosure is not limited thereto. For example, a driving unit (not illustrated) may be provided, and the attachment unit 22 may be rotated in the direction around the central axis AX by the driving of the driving unit (not illustrated) based on the control of the control unit CONT.

Figure 4:
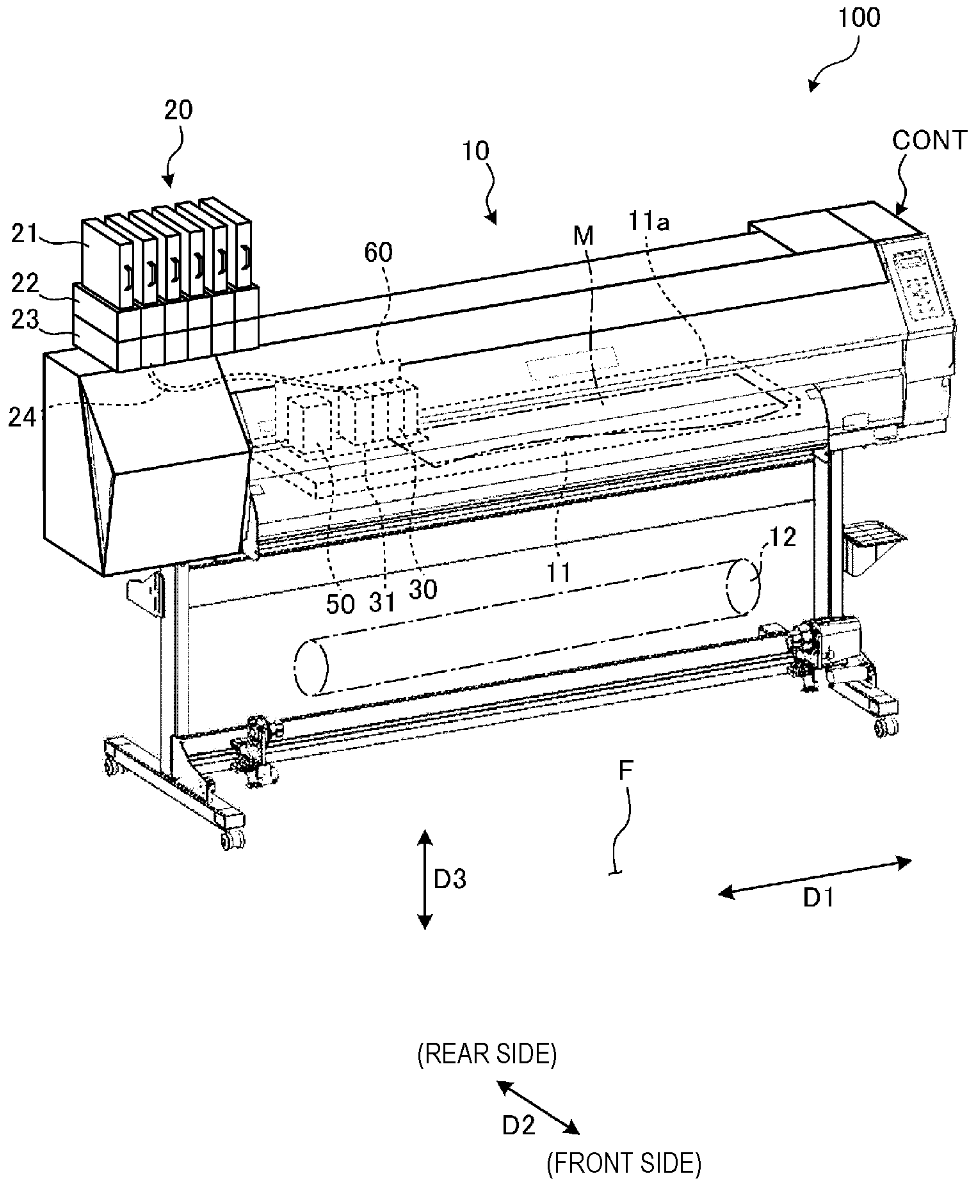
FIG. 4 is a perspective view illustrating another example of the printing apparatus.

In the embodiment described above, the configuration in which the ink supplying unit 20 is disposed on the floor F in the state of being separated from the body 10 has been described as an example, but the present disclosure is not limited thereto. FIG. 4 is a perspective view illustrating another example of the printing apparatus 100. As illustrated in FIG. 4, the ink supplying unit 20 may be provided integrally with the body 10.

What is claimed is:

1. An ink supplying device comprising:
- an attachment unit to which a cartridge for storing ink to be supplied to an inkjet head of a printing apparatus is attached and in which an internal flow path is formed for the ink stored in the cartridge to flow;
- an external tube that is connected to the internal flow path of the attachment unit and circulates the ink; and
- a base portion that supports the attachment unit and a part of the external tube, wherein
- the attachment unit is supported by the base portion so as to be rotatable in a direction around a predetermined central axis,
- the external tube has flexibility, and
- the external tube is fixed by a connecting portion connected to the internal flow path and a supported portion provided in the base portion and is disposed in a curved state between the connecting portion and the supported portion.

2. The ink supplying device according to claim 1, wherein
- the central axis and the connecting portion are disposed at different positions in a horizontal direction, and
- the external tube is disposed to extend toward the central axis.

3. The ink supplying device according to claim 2, wherein the supported portion is provided below the connecting portion in a vertical direction and is provided on the connecting portion side with respect to the central axis in the horizontal direction.

4. The ink supplying device according to claim 3, wherein the external tube is disposed in a curved state at a position corresponding to the central axis.

5. The ink supplying device according to claim 3, wherein the external tube is provided with such a length that a curved state is maintained during the rotation in a range in which the attachment unit is rotatable in the direction around an axis of the central axis.

6. A printing apparatus comprising:
- a body including an inkjet head that ejects ink onto a medium; and
- an ink supplying unit that supplies the ink to the inkjet head,
- wherein the ink supplying device according to claim 3 is used as the ink supplying unit.

7. The ink supplying device according to claim 2, wherein the external tube is disposed in a curved state at a position corresponding to the central axis.

8. The ink supplying device according to claim 7, wherein the external tube is provided with such a length that a curved state is maintained during the rotation in a range in which the attachment unit is rotatable in the direction around an axis of the central axis.

9. A printing apparatus comprising:
- a body including an inkjet head that ejects ink onto a medium; and
- an ink supplying unit that supplies the ink to the inkjet head,
- wherein the ink supplying device according to claim 7 is used as the ink supplying unit.

10. The ink supplying device according to claim 2, wherein the external tube is provided with such a length that a curved state is maintained during the rotation in a range in which the attachment unit is rotatable in the direction around an axis of the central axis.

11. A printing apparatus comprising:
- a body including an inkjet head that ejects ink onto a medium; and
- an ink supplying unit that supplies the ink to the inkjet head,
- wherein the ink supplying device according to claim 2 is used as the ink supplying unit.

12. The ink supplying device according to claim 1, wherein the external tube is provided with such a length that a curved state is maintained during the rotation in a range in which the attachment unit is rotatable in the direction around an axis of the central axis.

13. A printing apparatus comprising:
- a body including an inkjet head that ejects ink onto a medium; and
- an ink supplying unit that supplies the ink to the inkjet head,
- wherein the ink supplying device according to claim 12 is used as the ink supplying unit.

14. A printing apparatus comprising:
- a body including an inkjet head that ejects ink onto a medium; and an ink supplying unit that supplies the ink to the inkjet head, wherein the ink supplying device according to claim 1 is used as the ink supplying unit.

15. The printing apparatus according to claim 14, wherein the ink supplying unit is provided in a state of being separated from the body.

16. The printing apparatus according to claim 15, wherein the ink supplying unit is disposed at a position lower in height than the body.

17. The printing apparatus according to claim 14, wherein the ink supplying unit is disposed at a position lower in height than the body.

* * * * *